US012287255B2

(12) United States Patent
Fontaine et al.

(10) Patent No.: US 12,287,255 B2
(45) Date of Patent: Apr. 29, 2025

(54) METHODS AND APPARATUS TO AUTOMATICALLY DETERMINE FRICTION OF A CONTROL VALVE

(71) Applicant: FISHER CONTROLS INTERNATIONAL LLC, Marshalltown, IA (US)

(72) Inventors: Michael Fontaine, Marshalltown, IA (US); David Smid, Marshalltown, IA (US)

(73) Assignee: Fisher Controls International LLC, Marshalltown, IA (US)

( * ) Notice: Subject to any disclaimer, the term of this patent is extended or adjusted under 35 U.S.C. 154(b) by 84 days.

(21) Appl. No.: 18/321,579

(22) Filed: May 22, 2023

(65) Prior Publication Data

US 2023/0288291 A1 Sep. 14, 2023

Related U.S. Application Data

(63) Continuation of application No. 16/932,378, filed on Jul. 17, 2020, now Pat. No. 11,656,149.

(51) Int. Cl.
*G01M 13/003* (2019.01)
*G01N 19/02* (2006.01)

(52) U.S. Cl.
CPC .......... *G01M 13/003* (2019.01); *G01N 19/02* (2013.01)

(58) Field of Classification Search
None
See application file for complete search history.

(56) References Cited

U.S. PATENT DOCUMENTS 3,709,253 A * 1/1973 Spangenberg ........ F16K 31/423
137/596.2
4,523,286 A * 6/1985 Koga .................. F16K 37/0083
700/289

(Continued)

FOREIGN PATENT DOCUMENTS

CN 113944799 A 1/2022

OTHER PUBLICATIONS

United States Patent and Trademark Office, "Non-Final Action," issued in U.S. Appl. No. 16/932,378, filed Aug. 16, 2022, 8 pages.

(Continued)

*Primary Examiner* — Patrick Assouad
*Assistant Examiner* — Mark A Shabman
(74) *Attorney, Agent, or Firm* — Hanley, Flight & Zimmerman, LLC

(57) ABSTRACT

Methods, apparatus, systems and articles of manufacture are disclosed for automatically determining friction of a control valve. An example method includes measuring first and second pressures corresponding to respective first and second positions of a valve while stroking the valve in a first direction, measuring third and fourth pressures corresponding, respectively, to the second and first positions while stroking the valve in a second direction opposite the first direction, determining a first pressure difference between the second and third pressures, determining a second pressure difference between the first and fourth pressures, determining an average pressure based on the first and second pressure differences, comparing the average pressure to a third pressure difference corresponding to a range of travel of an actuator including the first and second positions, and determining a control step size for the valve based on the comparison.

18 Claims, 7 Drawing Sheets

(56) References Cited

U.S. PATENT DOCUMENTS

| | | | | |
|---|---|---|---|---|
| 4,976,144 | A * | 12/1990 | Fitzgerald | F16K 37/0083 73/862.27 |
| 5,425,270 | A * | 6/1995 | McDonald | F16K 37/0091 702/50 |
| 6,272,401 | B1 * | 8/2001 | Boger | F15B 21/087 700/282 |
| 6,466,893 | B1 * | 10/2002 | Latwesen | G05B 23/0229 702/41 |
| 8,055,431 | B2 * | 11/2011 | Asada | F02D 11/105 123/399 |
| 8,443,821 | B2 * | 5/2013 | Meier | F16K 37/0041 251/61 |
| 9,995,486 | B2 * | 6/2018 | Young | G05D 16/2033 |
| 11,656,149 | B2 | 5/2023 | Fontaine et al. | |
| 2003/0183280 | A1 * | 10/2003 | Ishii | G05D 16/2097 137/487.5 |
| 2004/0228173 | A1 * | 11/2004 | Schoonover | G05B 23/0254 365/158 |
| 2007/0150079 | A1 * | 6/2007 | Blevins | G05B 23/0251 700/41 |
| 2009/0222220 | A1 * | 9/2009 | Wilke | F16K 37/0091 702/41 |
| 2009/0234508 | A1 * | 9/2009 | Kallfass | E02F 9/2267 700/282 |
| 2013/0153798 | A1 * | 6/2013 | Kucera | F16K 37/0083 251/129.01 |
| 2014/0100673 | A1 * | 4/2014 | Amirthasamy | F16K 37/0075 700/32 |
| 2018/0231991 | A1 * | 8/2018 | Baxter | F16K 31/02 |

OTHER PUBLICATIONS

United States Patent and Trademark Office, "Notice of Allowance," issued in U.S. Appl. No. 16/932,378, filed Jan. 9, 2023, 9 pages.

United States Patent and Trademark Office, "Notice of Allowance," issued in U.S. Appl. No. 16/932,378, filed Apr. 24, 2023, 3 pages.

China National Intellectual Property Administration, "Office Action," issued May 10, 2024 in connection with Chinese Patent Application No. 202110814877.4, 3 pages (including machine translation).

The State Intellectual Property Office of People's Republic of China, "Rejection Decision," issued in connection with Chinese Patent Application No. 202110814877.4, dated Sep. 11, 2024, 8 pages. (English machine translation included).

* cited by examiner

METHODS AND APPARATUS TO AUTOMATICALLY DETERMINE FRICTION OF A CONTROL VALVE

RELATED APPLICATION

This patent arises from a continuation of U.S. patent application Ser. No. 16/932,378 (now U.S. Pat. No. 11,656, 149), which was filed on Jul. 17, 2020. U.S. patent application Ser. No. 16/932,378 is hereby incorporated herein by reference in its entirety. Priority to U.S. patent application Ser. No. 16/932,378 is hereby claimed.

FIELD OF THE DISCLOSURE

This disclosure relates generally to control valves and, more particularly, to automatically determine friction of a control valve.

BACKGROUND

Fluid control valves (e.g., sliding stem valves, rotary valves, axial flow valves, globe valves, etc.) are commonly used in industrial processes, such as oil and gas pipeline distribution systems and chemical processing plants, to control the flow of process fluids. These control valves are often automated using a fluid pressure operated (e.g., pneumatic) actuator that is controlled by a remote-operated field instrument. The field instrument communicates with a process control computer to command fluid flow changes within the valve to achieve a desired control strategy.

SUMMARY

An example method includes measuring first and second pressures corresponding to respective first and second positions of a valve while stroking the valve in a first direction, measuring third and fourth pressures corresponding, respectively, to the second and first positions while stroking the valve in a second direction opposite the first direction, determining a first pressure difference between the second and third pressures, determining a second pressure difference between the first and fourth pressures, determining an average pressure based on the first and second pressure differences, comparing the average pressure to a third pressure difference corresponding to a range of travel of an actuator including the first and second positions, and determining a control step size for the valve based on the comparison.

An example method includes determining an average control hysteresis value for a valve over a first range of travel of the valve, comparing the average control hysteresis value to a second value corresponding to a second range of travel of the valve encompassing the first range of travel of the valve, and selecting one of multiple control step sizes for the valve based on the comparison.

An example apparatus includes a hysteresis measurement controller to determine an average control hysteresis value for a valve over a first range of travel of the valve, a comparator to compare the average control hysteresis value to a second value corresponding to a second range of travel of the valve encompassing the first range of travel of the valve, and a step size selector to select one of multiple control step sizes for the valve based on the comparison.

BRIEF DESCRIPTION OF THE DRAWINGS

The figures are not to scale. In general, the same reference numbers will be used throughout the drawing(s) and accompanying written description to refer to the same or like parts.

DETAILED DESCRIPTION

Figure 1:
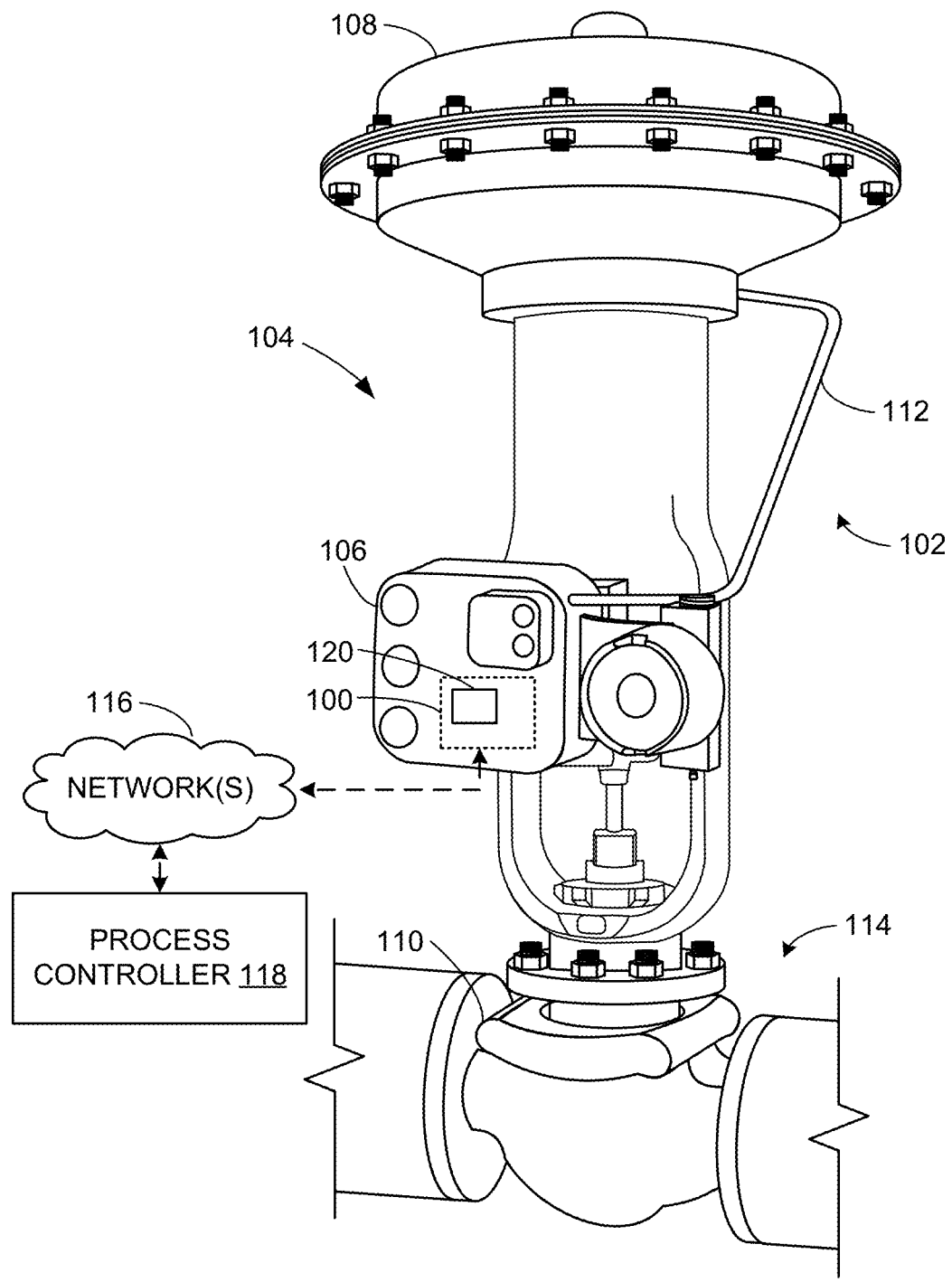
FIG. 1 illustrates an example valve positioner operating in a process control environment.

Field instruments, such valve positioners, are typically used to control the operation of a fluid valve in accordance with a predetermined process control strategy. To accurately control a valve to a commanded setpoint, a valve positioner compares a feedback signal, which typically corresponds to a current valve position, to a setpoint and adjusts the valve position based on a determined difference or error between the valve position and the setpoint. The feedback signal may be obtained by sensing a position of a stem or shaft of the valve or an actuator (e.g., a pneumatic actuator) controlled by the valve positioner and which operates the valve via a direct mechanical coupling to a stem or shaft of the valve. The feedback signal corresponds to a position of a flow control member within the valve relative to a valve seat and, thus, corresponds to a degree to which the valve is open or closed.

In practice, friction within a valve and actuator assembly can complicate the tuning of a positioner controlling the valve and actuator assembly. The friction may be due to a packing within the valve, movement of a flow control member against a valve body, cage, and/or seat of the valve, an actuator stem or shaft frictionally engaging a bearing or bushing, etc. Such friction can cause a significant amount of control hysteresis and/or decrease the ability of the actuator and valve to respond to small changes in setpoint. As a result, a control step size of the positioner must be selected that works well to accurately move the valve without delay given the amount of friction in the valve assembly. This also enables the gain of a control loop can be subsequently selected to minimize the effects of this hysteresis and responsiveness and thereby maximize the accuracy and stability of the control loop. If the control step size is not properly selected, the tuning process of the positioner may result in improper gain selection (e.g., the gain may be set too high). If the gain is not properly set, the operation of the control loop may result in inaccurate control and/or limit cycling about the setpoint that can prematurely wear the actuator and valve components.

Known techniques for tuning a valve positioner include manual or empirical adjustments in which a field technician may observe the operation and performance of the valve and actuator while making incremental adjustments to the control loop gain. Prior to observing the operation and performance of the valve and actuator, the field technician may input friction type of the valve to determine the control step size that will be used during the adjustments to the control loop gain. However, such a process is time consuming, expensive, and prone to error. Some known systems facilitate the efforts of a technician to tune the control loop by enabling the technician to input data relating to certain configuration and performance characteristics of the valve and actuator into the positioner, which may then select an appropriate control step size based on these entered characteristics. The gain is then determined by a tuning set selected during a tuning process. However, such an approach may not result in an optimal gain selection as the characteristics of individual valves and actuators may vary significantly. For example, a known system may allow the technician to select a packing type for the valve (e.g., Teflon, graphite, etc.), but the actual frictional characteristics of the individual packing types may vary enough to cause meaningful performance differences for a selected control step size value.

Examples disclosed herein enable a valve positioner or, more generally, any process control device communicatively coupled to a valve positioner to automatically determine the frictional characteristics of a fluid valve and actuator assembly without requiring user (e.g., field technician) input. Further, the examples disclosed herein can use the determined frictional characteristics of the valve and actuator assembly to automatically select a control step size for the valve positioner that is appropriate for the particular frictional characteristics of the valve and actuator assembly. As a result, the examples disclosed herein eliminate the need for a field technician to manually (e.g., empirically) determine a control step size value for each valve and actuator assembly and/or manually enter data into valve positioners to enable the positioners to select appropriate step size values. In other words, the examples disclosed herein enable a positioner to be automatically tuned or autotuned to eliminate the above-noted known time consuming and error prone manual tuning processes.

More specifically, the examples disclosed herein include a tuning controller that measures an average hysteresis of a valve and actuator assembly in terms of pressure input to the actuator. The examples disclosed herein compare the average hysteresis to the operating range (e.g., span) of the valve in terms of pressure. This comparison may be used to determine the average hysteresis as a percentage of the operating range. In accordance with the examples described herein, this percentage can then be used to determine the frictional characteristics of the valve and actuator assembly which, in turn, may be used to automatically select an appropriate control step size for the valve positioner controlling the valve and actuator. In some examples, the valve and actuator assembly may be identified as falling within two or more frictional classifications such as, for example, high or low friction.

Examples disclosed herein may implement the tuning controller within a valve positioner or any other type of field instrument that controls the operation of a valve actuator assembly. Alternatively, the example tuning controller disclosed herein may be implemented by another process controller communicatively coupled to a valve positioner and/or any combination of the valve positioner and other process controller.

FIG. 1 illustrates an example valve positioner 100 operating in a process control environment 102 to obtain valve position information for and control a fluid valve and actuator assembly 104 (hereinafter "valve assembly 104"). In the illustrated example, the positioner 100 is housed in an enclosure 106 and coupled to the example valve assembly 104 (e.g., a pneumatically actuated valve assembly) that includes at least an actuator 108 (e.g., a fluid actuator, a valve actuator, etc.) and a valve 110 (e.g., a globe valve, a gate valve, etc.). Although a sliding stem valve is shown in the example of FIG. 1, the examples described herein can be used with rotating shaft valves such as, for example, butterfly valves, ball valves, etc. Additionally, while the example of FIG. 1 employs a pneumatic actuator other types of actuators such as electric, hydraulic, electro-hydraulic actuators, etc. may be used instead.

In the illustrated example, the positioner 100 is communicatively coupled to a process controller 118 that that may provide setpoint signals and/or other commands to the positioner 100 via a network 116. Additionally, the positioner 100 can measure one or more parameter(s) such as, for example, valve travel (e.g., a position of the valve 110), an actuator pressure, a valve pressure, a drive signal (e.g., setpoint), etc. The positioner 100 can control the actuator 108 and/or the valve 110 via a parameter such as, for example, a command signal or an input signal (e.g., a setpoint). The enclosure 106 for the positioner 100 includes a connection point for a pneumatic tube connection 112. The positioner 100, in such examples, can further enable pneumatic control of the actuator 108 via the pneumatic tube connection 112. In the illustrated example, the valve assembly 104 is installed in a fluid process system 114 (e.g., a distribution piping system) of a plant environment or processing system.

In the illustrated example, the positioner 100 is coupled, via the network 116 to the process controller 118. The network 116, in some examples, can include one or more data buses (e.g., HART (Highway Addressable Remote Transducer) communication network, Foundation Fieldbus, Profibus (Process Field Bus), etc.), one or more Local Area Networks (LANs), one or more wireless LANs, one or more cellular networks, one or more private networks, one or more public networks, etc. The process controller 118, communicatively coupled to the positioner 100 via the network 116, is capable of tuning and/or configuring the positioner 100 to accurately control the function and/or operation of actuator 108 and/or the valve 110. For example, the controller 118 is capable of processing and/or storing one or more parameters generated by the positioner 100 (e.g., a position of the valve, a trip condition of the valve, a failure condition causing the trip conditions, etc.).

In the example of FIG. 1, the positioner 100 includes a tuning controller 120. As described in greater detail in connection with FIG. 2, the tuning controller 120 automatically determines the frictional characteristics of the valve assembly 104 and selects a control step size based on the determined frictional characteristics without requiring any user input (e.g., data entered by a field technician). While the tuning controller 120 is illustrated as being implemented within the positioner 100, all or part of the tuning controller 120 could alternatively be implemented by the process controller 118.

Figure 2:
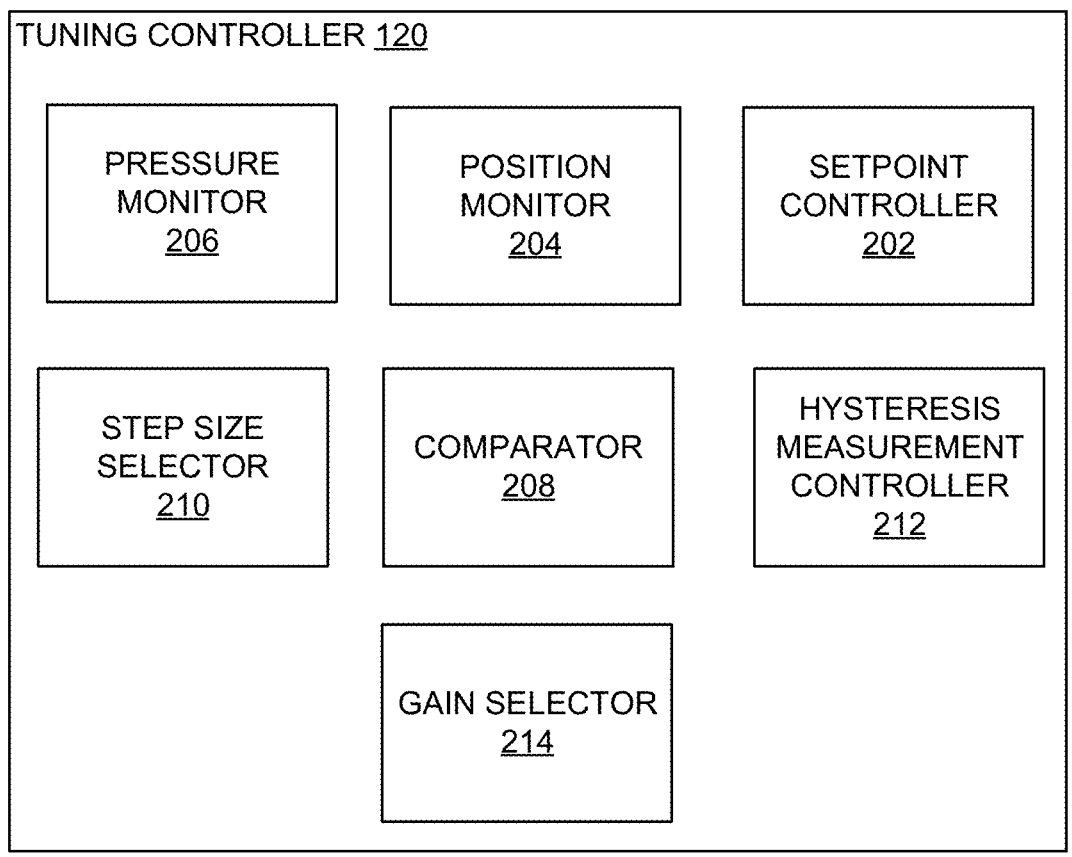
FIG. 2 illustrates a block diagram of the example tuning controller of FIG. 1.

FIG. 2 illustrates a block diagram of the example tuning controller 120. The tuning controller 120 includes an example setpoint controller 202, an example position monitor 204, an example pressure monitor 206, an example comparator 208, an example step size selector 210, an example hysteresis measurement controller 212, and a gain selector 214.

In the illustrated example of FIG. 2, the setpoint controller 202 generates setpoint signals in response to commands received from the hysteresis measurement controller 212 that are used by the positioner 100 to control the position of the actuator 108 and, thus, the valve 110. The setpoint signals may move the valve 110 through various positions within the operating range of the valve 110 to automatically determine the frictional characteristics of the valve assembly 104. For example, the setpoint controller 202 may generate position setpoints corresponding to a fully open or approximately fully open (e.g., 96% of span) position of the valve 110, a fully closed or approximately fully closed (e.g., 4% of span) position of the valve 110, and various intermediate positions of the valve 110 between the fully open and fully closed positions in accordance with a predetermined sequence of positions determined by the hysteresis measurement controller 212 that enables determination of the frictional characteristics of the valve assembly 104.

In the example of FIG. 2, the position monitor 204 monitors the position of the valve 110 (i.e., the position of a flow control member within the valve 110). Specifically, the position monitor 204 determines the position of the flow control member within the valve 110 relative to a fully closed or fully open position. Thus, the position monitor 204 may monitor the position of the valve 110 as a percentage of fully open (e.g., 0-100%, where 100% is fully open). The position monitor 204 may derive valve position measurements by receiving data or signals from the positioner 100 and sensor(s) coupled thereto. For example, the positioner 100 may be coupled to one or more sensors that measure a position of a stem of the valve 110 and/or a stem of the actuator 108.

In the example of FIG. 2, the pressure monitor 206 measures the pressure applied to the actuator 108 via the tubing 112. Similar to the position monitor 204, the pressure monitor 206 may derive pressure measurements by receiving data or signals from the positioner 100 and one or more pressure sensors coupled thereto.

The hysteresis measurement controller 212 measures the frictional characteristics of the valve assembly 104 based on measurements received from the position monitor 204 and the pressure monitor 206. For example, the hysteresis measurement controller 212 determines the average hysteresis and the operating range of the valve assembly 104, in terms of pressure, based on pressures applied to the actuator 108 corresponding to certain positions of the flow control member within the valve 110. The hysteresis measurement controller 212 sends commands to the setpoint controller 202 corresponding to various desired positions of the valve 110. The commands enable the hysteresis measurement controller 212 to determine average hysteresis and/or operating range of the valve assembly 104. For example, the hysteresis measurement controller 212 sends commands corresponding to a fully or approximately fully open position and fully or approximately fully closed position of the valve 110 when determining operating range. For example, a range of 4% to 96% of span may correspond to a span that ranges from approximately fully closed to approximately fully open. In other examples, the hysteresis measurement controller 212 sends commands corresponding to a sequence of positions of the valve 110 between fully closed and fully open positions to determine average hysteresis of the valve assembly 104. For example, the commands may stroke or move the valve 110 in one direction (e.g., toward fully open) from 40% to 60% of span and in the opposite direction (e.g., toward fully closed) from 60% to 40% to measure the control hysteresis and, thus, frictional characteristics of the valve assembly 104. More specifically, the hysteresis measurement controller 212 may cause the setpoint controller 202 to stroke the valve 110 from 40% to 60% and pause for pressure measurements by the pressure monitor 206 at multiple control positions within the range of 40% to 60%. For example, pressure measurements may be performed at 45%, 50%, and 55% of span. However, ranges other than 40% to 60% span and/or pressure measurement positions other than 45%, 50%, and 55% of span may be used to measure the control hysteresis of the valve assembly 104.

The comparator 208 compares the average hysteresis in terms of pressure and the operating range in terms of pressure to determine the average hysteresis as a percentage of the operating range. The comparator 208 provides the percentage of average hysteresis to the operating range to the step size selector 210 to determine the frictional characteristics of the valve assembly 104.

The step size selector 210 selects a step size for the positioner 100 by determining the frictional characteristics of the valve assembly 104 based on the results from the comparator 208. The selected step size corresponds to an appropriate control step size to facilitate tuning the positioner 100 to control the valve assembly 104. The step size selector 210 selects the step size based on whether the percentage of the average hysteresis to the operating range exceeds or does not exceed a percent threshold. The percent threshold may be configurable by an operator and corresponds to the amount, as a percentage, of average hysteresis relative to operating range at which the valve assembly 104 changes frictional characteristics. For example, a valve assembly 104 can be classified as a low friction valve assembly or high friction valve assembly. The step size selector 210 selects a larger step size when the percent of average hysteresis to operating range exceeds the percent threshold and selects a smaller step size when the percent of average hysteresis to operating range does not exceed the percent threshold. For example, if the valve assembly 104 exhibits a hysteresis that exceeds 10% of operating span, the valve assembly 104 may be considered a high friction valve assembly and a larger step size (e.g. a 10% step size) may be selected. If the hysteresis does not exceed 10% of operating span, the valve assembly 104 may be considered a low friction valve assembly and a smaller step size (e.g., a 5% step size) may be selected. More than two frictional categories and possible step size selections may be used to suit the needs of a particular application. For example, the frictional categories could be numbered (e.g., 1-5) and each frictional category may be assigned a corresponding step size (e.g., 2, 4, 6, 8 and 10).

In the example of FIG. 2, the gain selector 214 selects a gain value based on a tuning process performed by the positioner 100. More specifically, the tuning process receives and applies the control step size determined by the step size selector 210 to the positioner 100. The positioner 100 then iteratively tests the response of the valve and actuator assembly 104 to a step change in valve position using different gain values (e.g., selected from a predetermined number of gain values). In other words, once the step size selector 210 has provided an automatically determined control step size for use in controlling the valve and actuator assembly 104, the positioner 100 then determines an appropriate gain value by selecting the gain value that resulted in the best step response during the above-noted iterative response testing.

While an example manner of implementing the tuning controller 120 of FIG. 2 is illustrated in FIG. 2, one or more of the elements, processes and/or devices illustrated in FIG. 2 may be combined, divided, re-arranged, omitted, eliminated and/or implemented in any other way. Further, the example setpoint controller 202, the example position monitor 204, the example pressure monitor 206, the example comparator 208, the example step size selector 210, the example hysteresis measurement controller 212, the example gain selector 214, and/or, more generally, the example tuning controller 120 of FIG. 2 may be implemented by hardware, software, firmware and/or any combination of hardware, software and/or firmware. Thus, for example, any of the example setpoint controller 202, the example position monitor 204, the example pressure monitor 206, the example comparator 208, the example step size selector 210, the hysteresis measurement controller 212, the example gain selector 214, and/or, more generally, the example tuning controller 200 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example setpoint controller 202, the example position monitor 204, the example pressure monitor 206, the example comparator 208, the example step size selector 210, the example hysteresis measurement controller 212, and/or the example gain selector 214 is/are hereby expressly defined to include a non-transitory computer readable storage device or storage disk such as a memory, a digital versatile disk (DVD), a compact disk (CD), a Blu-ray disk, etc. including the software and/or firmware. Further still, the example tuning controller 120 of FIG. 2 may include one or more elements, processes and/or devices in addition to, or instead of, those illustrated in FIG. 2, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Flowcharts representative of example hardware logic, machine readable instructions, hardware implemented state machines, and/or any combination thereof for implementing the tuning controller 120 of FIG. 2 are shown in FIGS. 3-6. The machine readable instructions may be one or more executable programs or portion(s) of an executable program for execution by a computer processor such as the processor 712 shown in the example processor platform 700 discussed below in connection with FIG. 7. The program may be embodied in software stored on a non-transitory computer readable storage medium such as a CD-ROM, a floppy disk, a hard drive, a DVD, a Blu-ray disk, or a memory associated with the processor 712, but the entire program and/or parts thereof could alternatively be executed by a device other than the processor 712 and/or embodied in firmware or dedicated hardware. Further, although the example program is described with reference to the flowcharts illustrated in FIGS. 3-6, many other methods of implementing the example tuning controller 120 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine readable instructions described herein may be stored in one or more of a compressed format, an encrypted format, a fragmented format, a compiled format, an executable format, a packaged format, etc. Machine readable instructions as described herein may be stored as data (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement a program such as that described herein.

In another example, the machine readable instructions may be stored in a state in which they may be read by a computer, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, the disclosed machine readable instructions and/or corresponding program(s) are intended to encompass such machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example processes of FIGS. 3-6 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

Figure 3:
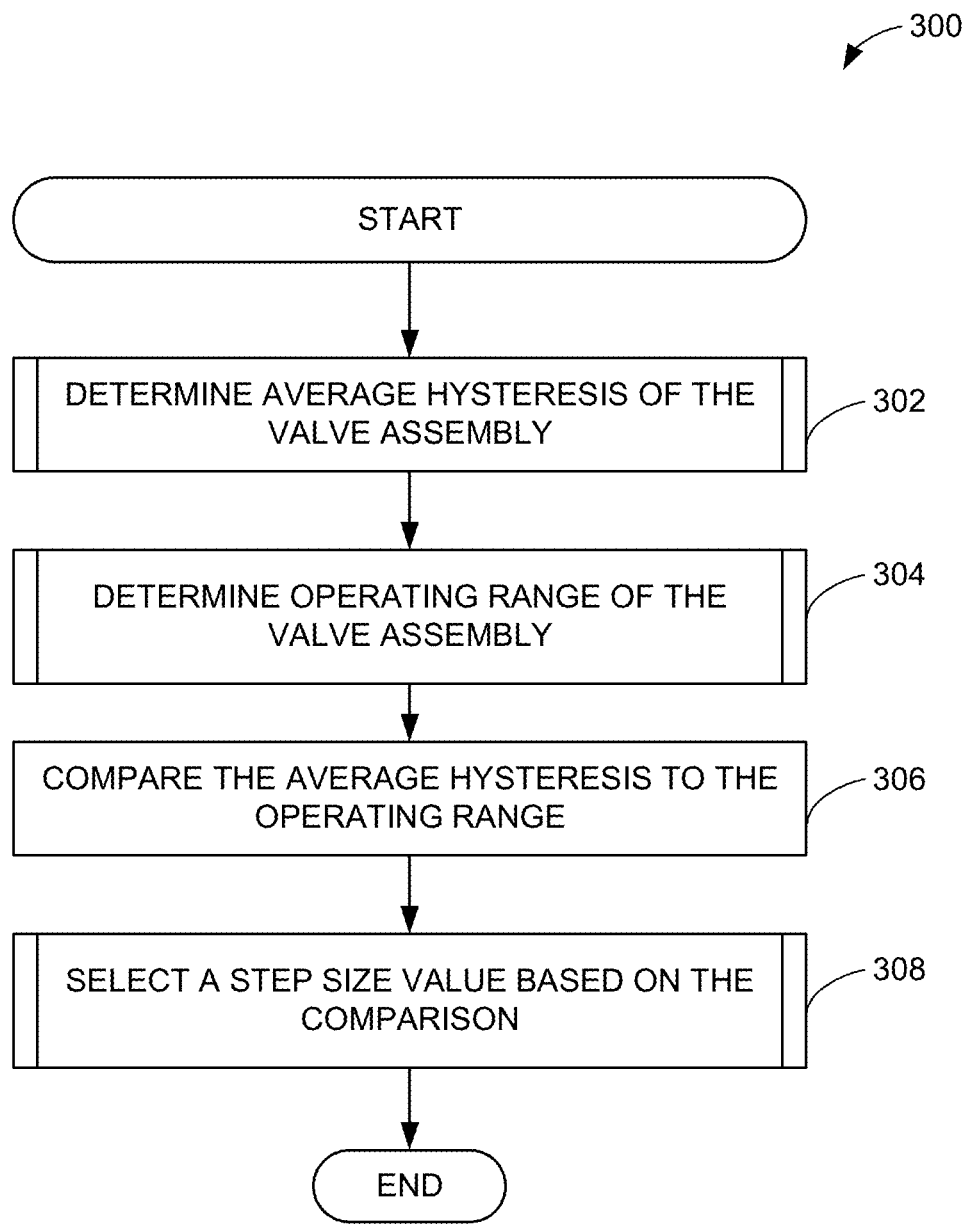
FIGS. 3-6 illustrates flowcharts representative of machine readable instructions which may be executed to implement the example tuning controller of FIGS. 1 and 2.

FIG. 3 illustrates an example method 300 that may be implemented by the tuning controller 120 of FIG. 2 to automatically select a control step size for use by the tuning controller (FIG. 1) to tune the positioner 100. More specifically, the example method 300 automatically tunes the positioner 100 by automatically measuring and/or assessing the frictional characteristics of the valve assembly 104 and selecting an appropriate control step size based on the frictional characteristics.

Turning in detail to FIG. 3, the tuning controller 120 (e.g., in response to instructions from the controller 118 (FIG. 1) to determine a control step size) determines the average hysteresis of the valve assembly 104 (block 302). More specifically, the hysteresis measurement controller 212 (FIG. 2) causes the setpoint controller 202 (FIG. 2) to send commands to the positioner 100 (FIG. 1) that stroke the valve 110 (FIG. 1) over a first range of travel (e.g., 40% to 60% of span). While the valve 110 is stroked toward a fully open condition and then toward a fully closed condition over the first range of travel, the pressure monitor 208 (FIG. 2) measures the pressure applied to the actuator 108 (FIG. 1) at multiple (e.g., 2, 3, 4, etc.) positions (e.g., 45%, 50%, 55%) within the first range of travel. The hysteresis measurement controller 212 determines the differences in the pressures measured at respective ones of the positions as the valve 110 is stroked in different directions and uses these difference in pressure to determine the average hysteresis of the valve assembly 104 over the first range of travel. The hysteresis of the valve assembly 104 and, thus, the average hysteresis of the valve assembly 104 is indicative of the frictional characteristics of the valve assembly 104. In particular, hysteresis in the control of the valve assembly 104 increases with increasing friction within the valve 110, the actuator 108 and, more generally, the valve assembly 104. A more detailed description of the manner in which the operations of block 302 are performed is provided in connection with FIG. 4 below.

The tuning controller 120 then determines the operating range of the valve assembly 104 (block 304). More specifically, the hysteresis measurement controller 212 causes the setpoint controller 202 to send commands to the positioner 100 (FIG. 1) that stroke the valve 110 (FIG. 1) over a second range of travel that encompasses the first range of travel and which is substantially equal to the operating range or full span of the valve assembly 104 (e.g., 4% to 96% of span). The operating range of the valve assembly 104 is then determined in terms of pressure by calculating a difference between the pressures measured by the pressure monitor 204 at the respective ends (e.g., 4% and 96%) of the operating range of the valve assembly 104.

At block 306, the tuning controller 120 compares the average hysteresis of the valve assembly 104 determined at block 302 to the operating range of the valve assembly 104 determined at block 304 to assess the frictional characteristics of the valve assembly 104. More specifically, the comparator 208 (FIG. 2) may divide the average hysteresis of the valve assembly 104 by the operating range of the valve assembly (both in terms of pressure) to determine the average hysteresis as a percentage of the operating range, which provides a measure of the relative amount of friction associated with control of the valve assembly.

At block 308, the tuning controller 120 selects a step size value for use by the positioner 100 based on the comparison at block 306. More specifically, the step size selector 210 (FIG. 2) may select one of multiple control step sizes for the valve assembly 104 based on the comparison. For example, if the comparison yields a result that is less than a threshold, (e.g., 10%) a first control step size (e.g., 5%) may be selected and, if the comparison yields a result that is greater than the threshold, a second control step size (e.g., 10%) greater than the first control step size may be selected. However, more than one threshold and more than two possible control step sizes may be employed as needed to suit the needs of a particular application.

Figure 4:
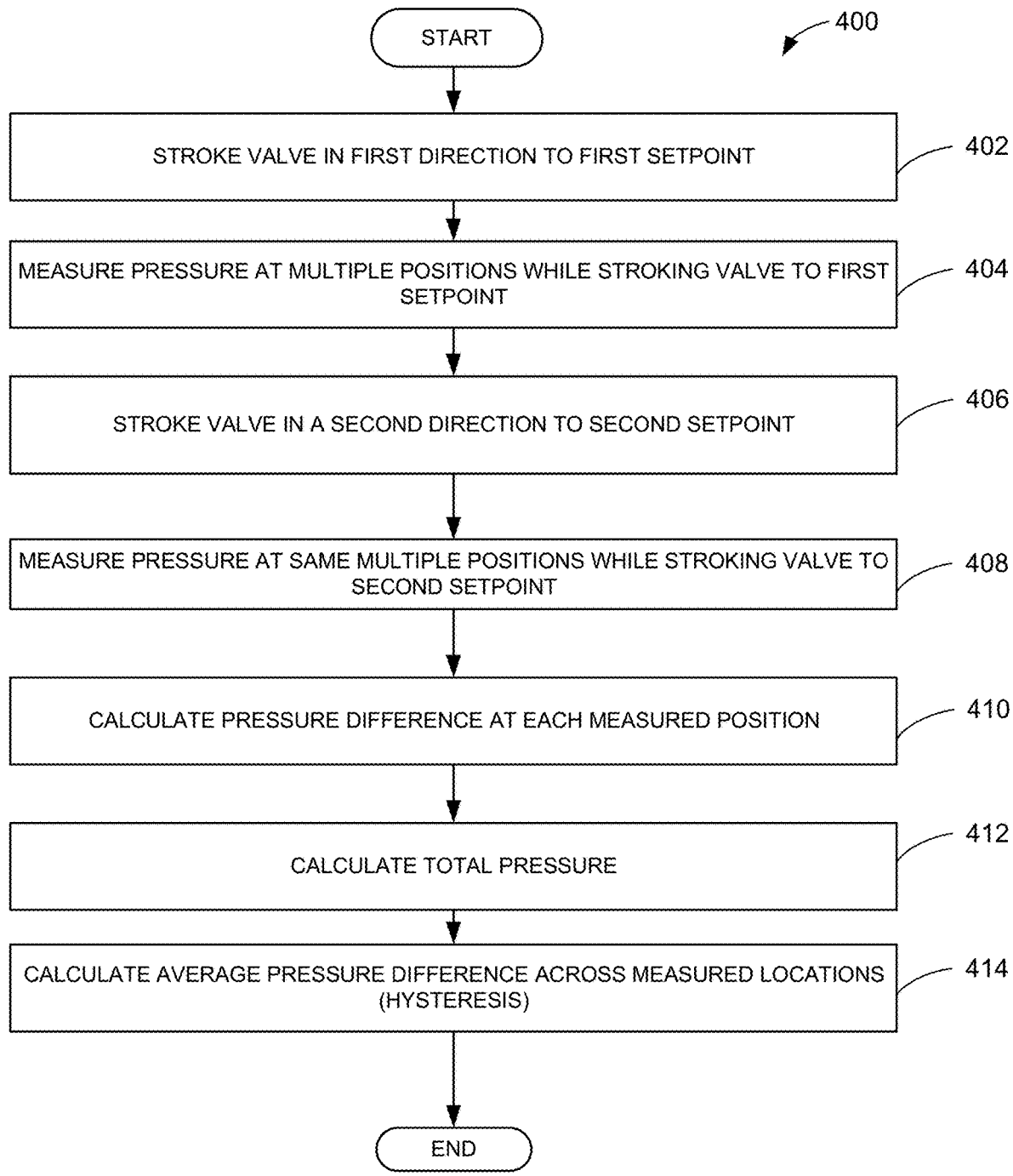

FIG. 4 depicts a method 400 that may be performed by the tuning controller of FIG. 2 to implement the operations of block 302 of FIG. 3. With reference to FIGS. 1-3, the hysteresis measurement controller 212 causes the setpoint controller 202 to send commands to the positioner 100 that stroke the valve 110 in a first direction to a first setpoint (block 402). For example, the hysteresis measurement controller 212 causes the setpoint controller 202 to move the valve 110 to 60% of span.

The example pressure monitor 206 measures the pressure at multiple positions while stroking the valve 110 to the first setpoint (block 404). For example, the pressure monitor 206 measures first, second, and third pressures corresponding to respective first, second, and third positions of the valve 110. The example position monitor 204 may cause the pressure monitor 206 to measure the pressure applied to the actuator 108 when the position monitor 204 determines that the valve 110 is at the multiple control positions (e.g., 45%, 50%, 55%). For example, the hysteresis measurement controller 212 may pause the stroking of the valve 110 towards a partially open position at multiple control positions within the range of 40% to 60% in response to one or more indications from the position monitor 204 that the valve 110 has reached the control positions. For example, the hysteresis measurement controller 212 may pause the valve at 45%, 50%, and 55%. In such an example, the pressure monitor 206 measures the pressure applied to the actuator 108 at 45%, 50%, and 55% of span.

The example hysteresis measurement controller 212 then causes the setpoint controller 202 to send commands to the positioner 100 that stroke the valve 110 in a second direction to a second setpoint (block 406). For example, the hysteresis measurement controller 212 causes the setpoint controller 202 to move the valve 110 to 40% from 60%.

The example pressure monitor 206 measures pressure at the same multiple positions while stroking the valve 110 to the second setpoint (block 408). For example, the pressure monitor 206 measures fourth, fifth, and sixth pressures corresponding, respectively, to the third, second, and first positions of the valve 110. The example position monitor 204 may cause the pressure monitor 206 to measure the pressure applied to the actuator 108 when the position monitor 204 determines that the valve 110 is at the multiple control positions (e.g., 55%, 50%, 45%). For example, the hysteresis measurement controller 212 may pause the stroking of the valve 110 towards a partially closed position at multiple control positions within the range of 60% to 40% in response to one or more indications from the position monitor 204. For example, the hysteresis measurement controller 212 may pause the valve at 55%. 50%, and 45%. In such an example, the pressure monitor 206 measures the pressure applied to the actuator 108 at 55%, 50%, and 45% of span.

The example hysteresis measurement controller 212 calculates the pressure difference at each measured position (block 410). For example, the hysteresis measurement controller 212 determines a first pressure difference between the first and sixth pressures (e.g., the pressures measured at 40% span), a second pressure difference between the second and fifth pressures (e.g., pressures measured at 50% span), and a third pressure difference between the third and fourth pressures (e.g., pressures measured at 55% span). In some examples, the first pressure difference corresponds to a first control hysteresis value of the valve 110 at a first end of the first range of travel, the second pressure difference corresponds to a second control hysteresis value of the valve 110 at a mid-point, and the third pressure difference corresponds to a third control hysteresis value of the valve 110 at a second end of the first range of travel.

The example hysteresis measurement controller 212 then calculates the total pressure (block 412). For example, the hysteresis measurement controller 212 utilizes Equation 1 below to determine the total hysteresis in PSI. In Equation 1, $\Delta_1$ corresponds to the first pressure difference between the pressures measured at the first position (40%), $\Delta_2$ corresponds to the second pressure difference between the pressures measured at the second position (50%), and $\Delta_3$ corresponds to the third pressure difference between the pressures measured at the third position (55%).

$$\text{Total Pressure} = (\Delta_1 + \Delta_2 + \Delta_3)/2 \quad \text{Equation 1}$$

The example hysteresis measurement controller 212 then calculates the average pressure difference across measured locations (hysteresis) (block 414). The example hysteresis measurement controller 212 determines the average pressure based on the first, second, and/or third pressure differences. For example, the hysteresis measurement controller 212 determines the average control hysteresis of the valve 110, and more generally the valve assembly 104, by averaging the first control hysteresis value, the second control hysteresis value, and the third control hysteresis value. The hysteresis measurement controller 212 may utilize Equation 2 below to determine the average pressure difference (e.g., average control hysteresis) of the valve assembly 104.

$$\text{Average Pressure Difference} = \text{Total Pressure}/3 \quad \text{Equation 2}$$

In some examples, the hysteresis measurement controller 212 stores the average pressure difference in memory (e.g., such as internal memory) and/or provides the average pressure difference to the comparator 208.

Figure 5:
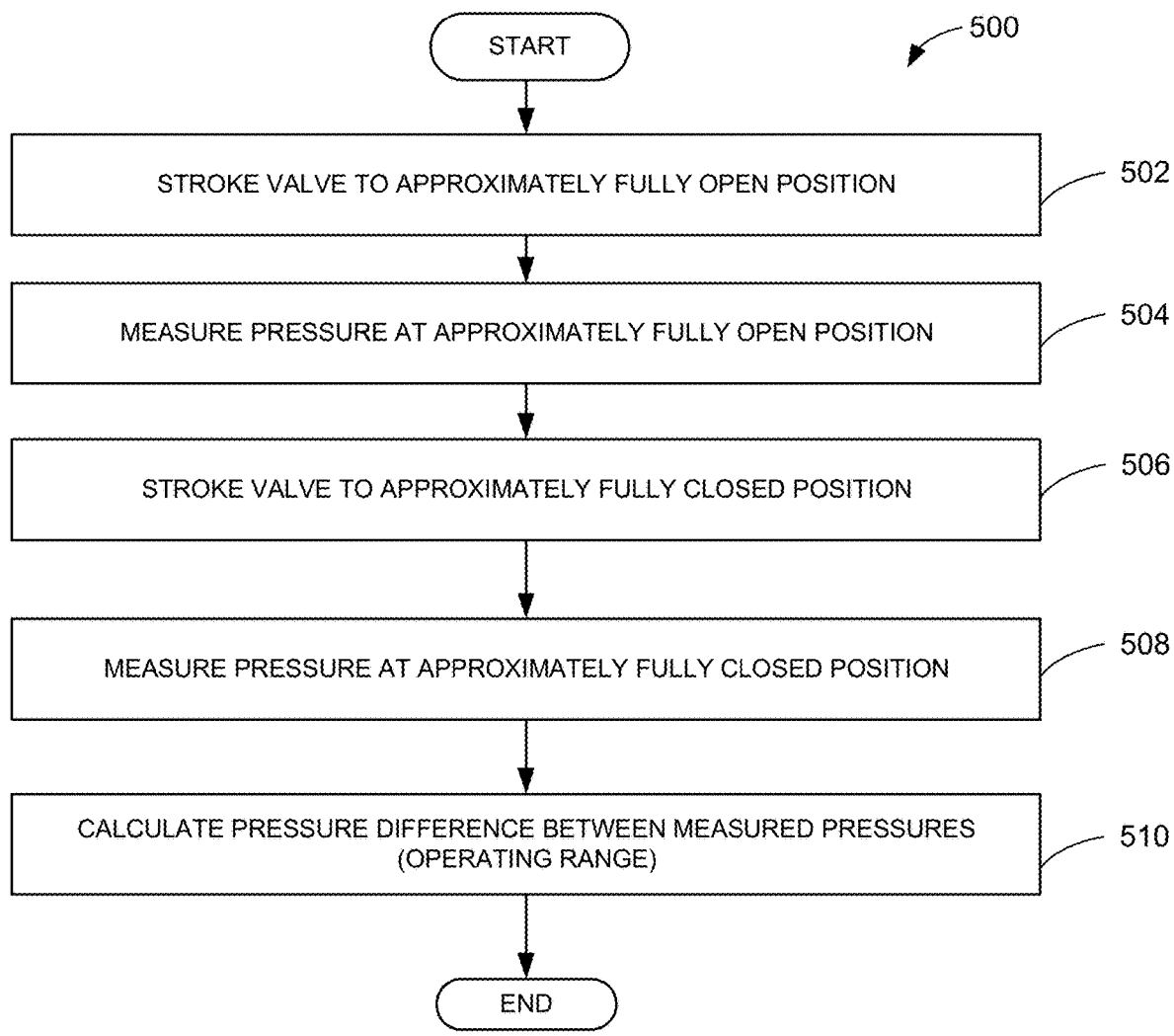

FIG. 5 depicts a method 500 that may be performed by the tuning controller of FIG. 2 to implement the operations of block 304 of FIG. 3. With reference to FIGS. 1-3, the hysteresis measurement controller 212 causes the setpoint controller 202 to send commands to the positioner 100 that strokes the valve 110 to an approximately fully open position (block 502). For example, the hysteresis measurement controller 212 causes the positioner 100 to stroke the valve 110 in the first direction towards a fourth position (96% span). In some examples, the setpoint controller 202 generates a setpoint signal in response to a notification (e.g., operating range notification) from the hysteresis measurement controller 212. The setpoint signal causes the positioner 100 to move the valve 110, in the first direction, towards the approximately fully open position (96% span).

The example pressure monitor 206 measures the pressure at the approximately fully open position (block 504). For example, the pressure monitor 206 measures a seventh pressure corresponding to the fourth position (e.g., 96% span). For example, the position monitor 204 may cause the pressure monitor 206 to measure the pressure applied to the actuator 108 when the position monitor 204 determines that the valve 110 is at the approximately fully open position (e.g., 96% span). In some examples, the hysteresis measurement controller 212 causes the positioner 100 to stop the travel of the valve 110 when the valve 100 reaches the approximately fully open position.

The example hysteresis measurement controller 212 then causes the example setpoint controller 202 to send commands to the positioner 100 that stroke the valve 110 to an approximately fully closed position (block 506). For example, the hysteresis measurement controller 212 causes the positioner 100 to stroke the valve 110 in the second direction towards a fifth position (e.g., 4% span). In some examples, the setpoint controller 202 generates a setpoint signal in response to a notification from the pressure monitor 206 and/or the hysteresis measurement controller 212, indicative of a pressure measurement taken at the approximately fully open position, that causes the positioner 100 to move the valve 110, in the second direction, towards the approximately fully closed position (e.g., 4% span).

The example pressure monitor 206 then measures the pressure at the approximately fully closed position (block 508). For example, the pressure monitor 206 measures an eighth pressure corresponding to the fifth position (e.g., 4% span). The position monitor 204 may cause the pressure monitor 206 to measure the pressure applied to the actuator 108 when the position monitor 204 determines that the valve 110 is at an approximately fully closed open position (e.g., 4%). In some examples, the hysteresis measurement controller 212 causes the positioner 100 to stop the travel of the valve 110 when the valve 110 reaches the approximately fully closed position. In the method 500 of FIG. 5, the fourth and fifth positions correspond to first and second ends of the second range of travel of the valve 110, wherein the first and second ends correspond to more than 90% of travel span of the valve 110.

The example hysteresis measurement controller 212 then calculates the pressure difference between measured pressures (operating range) (block 510). For example, the hysteresis measurement controller 212 subtracts the pressure measured at the approximately fully closed position (4% span) from the pressure measured at the approximately fully opened position (96% span). The difference between the two pressure measurements corresponds to the operating range, in pressure, of the valve assembly 104. In some examples, the hysteresis measurement controller 212 provides the operating range, in terms of pressure, to the example comparator 208 for a comparison between the operating range and the average pressure difference of the valve assembly 104.

Figure 6:
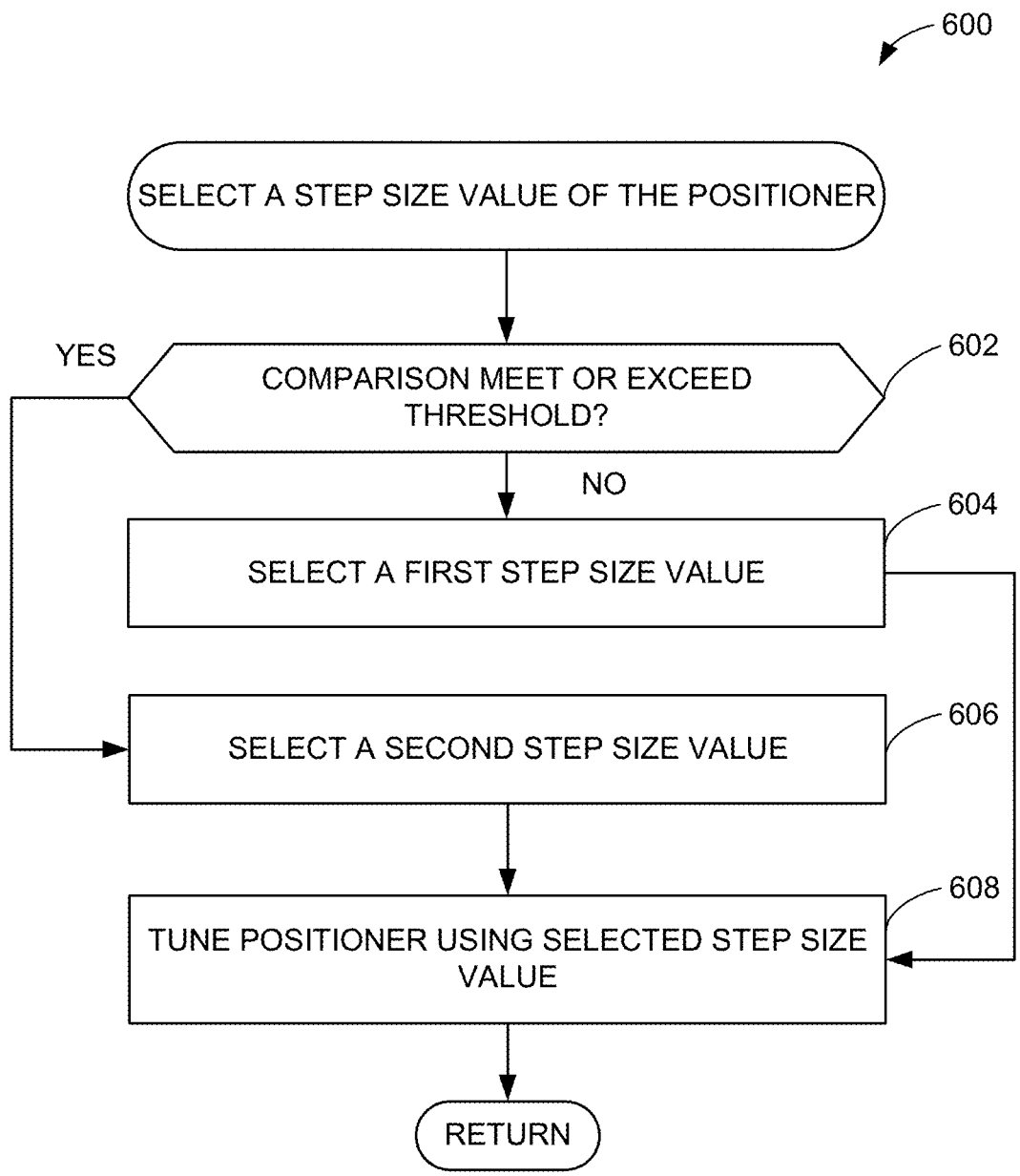

FIG. 6 depicts a method 600 that may be performed by the tuning controller of FIG. 2 to implement the operations of block 308 of FIG. 3. With reference to FIGS. 1-3, the example step size selector 210 receives the comparison of pressure measurements from the example comparator 308 and determines if the comparison meets or exceeds a threshold (block 602). For example, the step size selector 210 determines if a percentage of the average pressure difference (e.g., hysteresis) relative to the operating range span is equal to or greater than a threshold value. For example, the step size selector 210 may store and/or set a threshold value (e.g., 10%) indicative of a maximum pressure difference relative to the operating range. The threshold value may be determined by an operator of the valve assembly 104, such that the threshold value is specific to the application of the valve assembly 104. The threshold value may be a percent value, a decimal value, etc. In some examples, the threshold value assists in determining a control step size.

If the example step size selector 210 determines the comparison does not meet or exceed the threshold (e.g., block 602 returns a value NO), the example step size selector 210 selects a first control step size value (block 604). For example, if the comparison yields a result that is less than a threshold (e.g., 10%), a first control step size (e.g., 5%) is selected. In some examples, the first control step size is half of a second control step size. The first control step size may be appropriate for tuning the positioner 100 to control a lower friction valve assembly 104.

If the example step size selector 210 determines the comparison meets or exceeds the threshold (e.g., block 602 returns a value YES), the example step size selector 210 selects a second control step size value (block 606). For example, if the comparison yields a result that is greater than a threshold (e.g., 10%), a second control step size (e.g., 10%) greater than the first control step size is selected. The second control step size may be appropriate for tuning the positioner 100 to control a higher friction valve assembly 104. In some examples, when the comparison meets or exceeds the threshold, the step size selector 210 selects a control step size that is twice the size of the first control step size.

When the step size selector 210 selects a control step size value, the step size selector 210 tunes the example positioner 100 using the selected step size value (block 608). For example, the step size selector 210 and/or more generally, the tuning controller 120, sends instructions to the positioner 100 to utilize the selected control step size to accurately control the valve 110 to a commanded setpoint.

Figure 7:
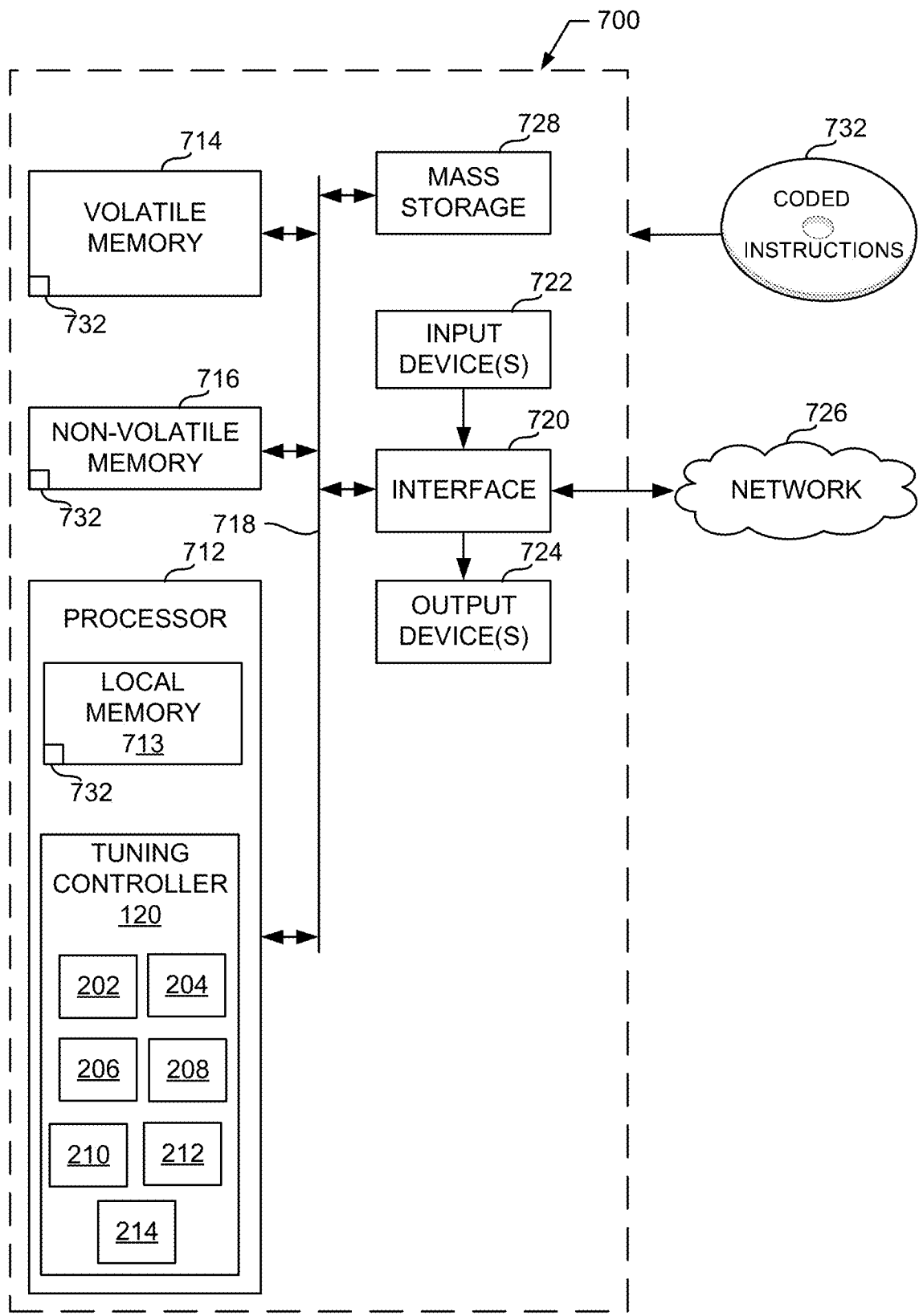
FIG. 7 is a block diagram of an example processing platform structured to execute the instructions of FIGS. 3-6 to implement the example tuning controller of FIG. 2.

FIG. 7 is a block diagram of an example processor platform 700 structured to execute the instructions of FIGS. 3-6 to implement the tuning controller 120 of FIG. 2. The processor platform 700 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, or any other type of computing device.

The processor platform 700 of the illustrated example includes a processor 712. The processor 712 of the illustrated example is hardware. For example, the processor 712 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example setpoint controller 202, the example position monitor 204, the example pressure monitor 206, the example comparator 208, the example step size selector 210, the example hysteresis measurement controller 212, and the example gain selector 214.

The processor 712 of the illustrated example includes a local memory 713 (e.g., a cache). The processor 712 of the illustrated example is in communication with a main memory including a volatile memory 714 and a non-volatile memory 716 via a bus 718. The volatile memory 714 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 716 may be implemented by flash memory and/or any other desired type of memory device. Access to the main memory 714, 716 is controlled by a memory controller.

The processor platform 700 of the illustrated example also includes an interface circuit 720. The interface circuit 720 may be implemented by any type of interface standard, such as an Ethernet interface, a universal serial bus (USB), a Bluetooth® interface, a near field communication (NFC) interface, and/or a PCI express interface.

In the illustrated example, one or more input devices 722 are connected to the interface circuit 720. The input device(s) 722 permit(s) a user to enter data and/or commands into the processor 712. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 724 are also connected to the interface circuit 720 of the illustrated example. The output devices 724 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), and/or a tactile output device. The interface circuit 720 of the illustrated example, thus, typically includes a graphics driver card, a graphics driver chip and/or a graphics driver processor.

The interface circuit 720 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 726. The communication can be via, for example, an Ethernet connection, a digital subscriber line (DSL) connection, a telephone line connection, a coaxial cable system, a satellite system, a line-of-site wireless system, a cellular telephone system, etc.

The processor platform 700 of the illustrated example also includes one or more mass storage devices 728 for storing software and/or data. Examples of such mass storage devices 728 include floppy disk drives, hard drive disks, compact disk drives, Blu-ray disk drives, redundant array of independent disks (RAID) systems, and digital versatile disk (DVD) drives.

The machine executable instructions 732 of FIGS. 3-6 may be stored in the mass storage device 728, in the volatile memory 714, in the non-volatile memory 716, and/or on a removable non-transitory computer readable storage medium such as a CD or DVD.

From the foregoing, it will be appreciated that example methods, apparatus and articles of manufacture have been disclosed that determine a control step size for a valve assembly without the use of user input by determining an average hysteresis of the valve assembly and comparing the average hysteresis to an operating range span of the valve to automatically select an appropriate gain value for a positioner.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:

1. A method comprising:
   measuring first and second pressures corresponding to respective first and second positions of a valve while stroking the valve in a first direction;
   measuring third and fourth pressures corresponding, respectively, to the second and first positions while stroking the valve in a second direction opposite the first direction;
   determining a first pressure difference between the second and third pressures;
   determining a second pressure difference between the first and fourth pressures;
   determining an average pressure based on the first and second pressure differences;
   comparing the average pressure to a third pressure difference corresponding to third and fourth positions along a range of travel of an actuator, the range of travel including the first and second positions; and
   determining a control step size for the valve based on the comparison.

2. The method of claim 1, wherein comparing the average pressure to the third pressure difference includes dividing the average pressure by the third pressure difference to determine the average pressure as a percentage of the third pressure difference.

3. The method of claim 2 further comprising determining the third pressure difference by measuring fifth and sixth pressures corresponding to the third and fourth positions of the valve and calculating a difference between the fifth and sixth pressures.

4. The method of claim 3, wherein the third and fourth positions of the valve correspond to more than 90% of a travel span of the valve.

5. The method of claim 1, wherein determining the control step size for the valve based on the comparison includes selecting a second control step size greater than a first control step size if the comparison yields a value exceeding a predetermined threshold.

6. The method of claim 5, wherein the first control step size is approximately half of the second control step size.

7. An apparatus comprising:
   a pressure monitor structured to:
      measure first and second pressures corresponding to respective first and second positions of a valve while stroking the valve in a first direction; and
      measure third and fourth pressures corresponding, respectively, to the second and first positions while stroking the valve in a second direction opposite the first direction;
   a hysteresis measurement controller structured to:
      determine a first pressure difference between the second and third pressures;
      determine a second pressure difference between the first and fourth pressures; and
      determine an average pressure based on the first and second pressure differences;
   a comparator structured to compare the average pressure to a third pressure difference corresponding to a range of travel of an actuator including the first and second positions; and
   a step size selector structured to determine a control step size for the valve based on the comparison.

8. The apparatus of claim 7, wherein the comparator is structured to divide the average pressure by the third pressure difference to determine the average pressure as a percentage of the third pressure difference.

9. The apparatus of claim 7, wherein the hysteresis measurement controller is structured to determine the third pressure difference by measuring fifth and sixth pressures corresponding to third and fourth positions of the valve and calculating a difference between the fifth and sixth pressures.

10. The apparatus of claim 9, wherein the third and fourth positions of the valve correspond to more than 90% of a travel span of the valve.

11. The apparatus of claim 7, wherein the step size selector is structured to select a second control step size greater than a first control step size if the comparison yields a value exceeding a predetermined threshold.

12. The apparatus of claim 11, wherein the first control step size is approximately half of the second control step size.

13. An apparatus comprising:
   means for measuring:
      first and second pressures corresponding to respective first and second positions of a valve while stroking the valve in a first direction; and
      third and fourth pressures corresponding, respectively, to the second and first positions while stroking the valve in a second direction opposite the first direction;
   means for determining:
      a first pressure difference between the second and third pressures;
      a second pressure difference between the first and fourth pressures; and
      an average pressure based on the first and second pressure differences;
   means for comparing the average pressure to a third pressure difference corresponding to a range of travel of an actuator including the first and second positions; and means for selecting a control step size for the valve based on the comparison.

14. The apparatus of claim 13, wherein the means for comparing is for dividing the average pressure by the third pressure difference to determine the average pressure as a percentage of the third pressure difference.

15. The apparatus of claim 13, wherein the means for determining is for determining the third pressure difference by measuring fifth and sixth pressures corresponding to third and fourth positions of the valve and calculating a difference between the fifth and sixth pressures.

16. The apparatus of claim 15, wherein the third and fourth positions of the valve correspond to more than 90% of a travel span of the valve.

17. The apparatus of claim 13, wherein the means for selecting is for selecting a second control step size greater than a first control step size if the comparison yields a value exceeding a predetermined threshold.

18. The apparatus of claim 17, wherein the first control step size is approximately half of the second control step size.

\* \* \* \* \*